(12) United States Patent
Dong et al.

(10) Patent No.: US 10,521,354 B2
(45) Date of Patent: Dec. 31, 2019

(54) COMPUTING APPARATUS AND METHOD WITH PERSISTENT MEMORY

(71) Applicant: Intel Corporation, Santa Clara, CA (US)

(72) Inventors: Yao Zu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 15/572,756

(22) PCT Filed: Jun. 17, 2015

(86) PCT No.: PCT/CN2015/000423
§ 371 (c)(1),
(2) Date: Nov. 8, 2017

(87) PCT Pub. No.: WO2016/201589
PCT Pub. Date: Dec. 22, 2016

(65) Prior Publication Data
US 2018/0107605 A1    Apr. 19, 2018

(51) Int. Cl.
*G06F 12/00* (2006.01)
*G06F 12/1009* (2016.01)
(Continued)

(52) U.S. Cl.
CPC ...... *G06F 12/1009* (2013.01); *G06F 9/45558* (2013.01); *G06F 11/073* (2013.01);
(Continued)

(58) Field of Classification Search
None
See application file for complete search history.

(56) References Cited

U.S. PATENT DOCUMENTS

| 7,093,086 B1 | 8/2006 | van Rietschote |
| 2009/0113109 A1 | 4/2009 | Nelson et al. |

(Continued)

FOREIGN PATENT DOCUMENTS

| CN | 101727331 A | 6/2010 |
| CN | 102306126 A | 1/2012 |

OTHER PUBLICATIONS

Extended European Search Report dated Dec. 19, 2018 for European Patent Application No. 15895162.4, 10 pages.

(Continued)

*Primary Examiner* — Baboucarr Faal
(74) *Attorney, Agent, or Firm* — Schwabe, Williamson & Wyatt, P.C.

(57) ABSTRACT

Apparatuses, methods and storage medium associated with computing that include usage and backup of persistent memory are disclosed herein. In embodiments, an apparatus for computing may comprise one or more processors and persistent memory to host operation of one or more virtual machines; and one or more page tables to store a plurality of mappings to map a plurality of virtual memory pages of a virtualization of the persistent memory of the one or more virtual machines to a plurality of physical memory pages of the persistent memory allocated to the one or more virtual machines. The apparatus may further include a memory manager to manage accesses of the persistent memory that includes a copy-on-write mechanism to service write instructions that address virtual memory pages mapped to physical memory pages that are marked as read-only. Other embodiments may be described and/or claimed.

23 Claims, 7 Drawing Sheets

(51) Int. Cl.
  G06F 12/16    (2006.01)
  G06F 9/455    (2018.01)
  G06F 11/07    (2006.01)
  G06F 11/14    (2006.01)
(52) U.S. Cl.
  CPC .......... G06F 11/0712 (2013.01); G06F 11/14 (2013.01); G06F 12/16 (2013.01); *G06F 2009/45583* (2013.01)

(56) References Cited

U.S. PATENT DOCUMENTS

| 2009/0327575 | A1* | 12/2009 | Durham | G06F 12/145 711/6 |
| 2010/0106885 | A1* | 4/2010 | Gao | G06F 8/65 711/6 |
| 2014/0006734 | A1* | 1/2014 | Li | G06F 9/45558 711/162 |
| 2014/0164722 | A1 | 6/2014 | Garthwaite et al. | |
| 2014/0372596 | A1* | 12/2014 | Bala | G06F 11/3003 709/224 |
| 2015/0378766 | A1* | 12/2015 | Beveridge | G06F 16/273 718/1 |

OTHER PUBLICATIONS

Jonathan M. Smith et al., "Effects of copy-on-write Memory Management on the Response Time of UNIX fork Operations", Jun. 21, 1988, 24 pages, vol. 1, No. 3, Berkley, CA.

Long Wang et al., "VM-[mu] Checkpoint: Design, Modeling, and Assessment of Lightweight In-Memory VM Checkpointing", Mar./Apr. 2015, 13 pages; IEEE Transactions on Dependable and Secure Computing, vol. 12, No. 2, New York, NY.

International Search Report and Written Opinion dated Mar. 14, 2016 for International Application No. PCT/CN2015/000423, 11 pages.

\* cited by examiner

COMPUTING APPARATUS AND METHOD WITH PERSISTENT MEMORY

CROSS REFERENCE TO RELATED APPLICATIONS

The present application is a national phase entry under 35 U.S.C. § 371 of International Application No. PCT/CN2015/000423, filed Jun. 17, 2015, entitled "COMPUTING APPARATUS AND METHOD WITH PERSISTENT MEMORY", which designated, among the various States, the United States of America. The Specifications of the PCT/CN2015/000423 Application is hereby incorporated by reference.

TECHNICAL FIELD

The present disclosure relates to the field of computing. More particularly, the present disclosure relates to usage and backup of persistent memory.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A Non-Volatile Dual In-line Memory Module (NVDIMM) is a computer-readable memory having a series of dynamic random access memory integrated circuits that is byte addressable and can retain data even when electrical power is removed either from an unexpected power loss, system crash or from a normal system shutdown. With recent advances, it is expected that NVDIMM will provide large capacity, high speed, byte addressable non-volatile memories for computing platforms—hereafter referred as persistent memory (PMEM). It is expected PMEM modules may soon have the capacity of 128 gigabytes (GB) to 512 GB, and a platform with multiple PMEM modules can composite a few terabytes (TB) of non-volatile memories. Thus, in a future PMEM based virtualized computing platform, each guest virtual machine (VM) may have a large portion of the computing platform's PMEM, e.g., a TB. The guest VM with a virtualization of PMEM (vPMEM) may have large capacity, non-volatile fast access speed memories, suitable for performance critical usages such as databases, or mission critical usages, such as mail servers.

However, such PMEM based systems may also suffer from 1) hardware failure including the NVDIMM failure, 2) the endurance of the PMEM may fail one day, or 3) a virus or malicious software may delete and/or overwrite the PMFM data the guest VM has. Accordingly, regular data backup, such as using tape and/or additional hard disks, of the massive vPMEM data, and ensuring their availability to restore the system to a previous snapshot under one of the above situations, is important, to mitigate the impact of data lost for mission critical usage. Moreover, for many performance or mission critical applications, the backup needs to be live backup, with the applications remain available, since a full backup can take hours or even longer.

Existing data backup mechanisms are typically based on block input/output (I/O) based disk device, and/or require application specific solutions. Often, a built-in mechanism is employed to maintain enough knowledge to provide an integrated snapshot of the internal disk data, so that the backup data can be used to rebuild the system. For example, Microsoft® Exchange Server has a built-in mechanism to export its internal server disk data to external disk storage. As a further example, shadow copy is another technology used by native operating system (OS) to take a snap shot of its internal files or volumes when the OS is running. It requires OS built-in features. (Note that the integrated data snapshot is important, because the backup process may take couple hours or even longer, and the data during the backup process may vary a lot leading to a situation where the backup data (those going to backup (which are new), plus already backed-up data in tapes/disks (which are old)), forming an invalid combination. An alternative solution is to use multiple storage disks (from multiple nodes) to form a redundant array of inexpensive disk (RAID) system so that failure of a node can be restored based on the redundancy the RAID system uses. However, these existing solutions either require the application-specific functionality support (which is not widely available), or they require the system to use the slow disks with central processing unit (CPU) intervention to the input/output (I/O) path to construct the redundancy. None of them are application-agnostic, or desirable for the future high capacity, high speed, byte addressable PMEM based systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
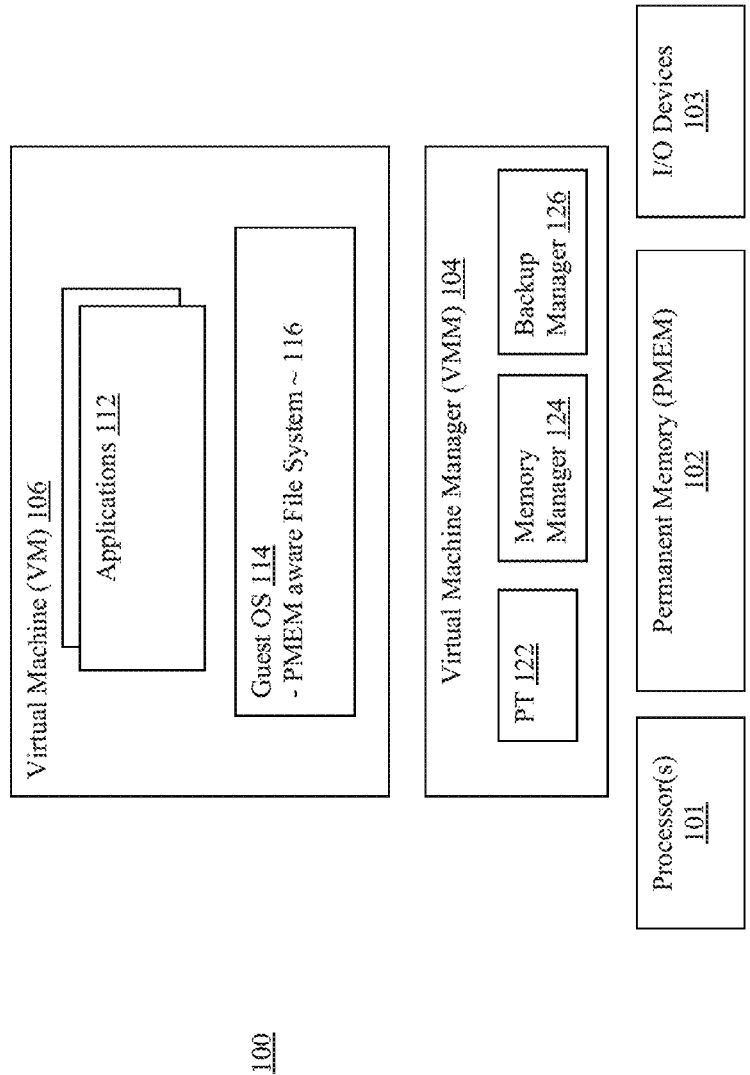
FIG. 1 illustrates an example computing system having the persistent memory usage and backup technology of the present disclosure, according to various embodiments.

Apparatuses, methods and storage medium associated with computing that include usage and backup of persistent memory are disclosed herein. In embodiments, an apparatus for computing may comprise one or more processors and persistent memory to host operation of one or more virtual machines; and one or more page tables to store a plurality of mappings to map a plurality of virtual memory pages of a virtualization of the persistent memory of the one or more virtual machines to a plurality of physical memory pages of the persistent memory allocated to the one or more virtual machines. The apparatus may further include a memory manager to manage accesses of the persistent memory that includes a copy-on-write mechanism to service write instructions that address virtual memory pages mapped to physical memory pages that are marked as read-only.

In embodiments, the apparatus may further comprise a backup manager to backup data stored in a first subset of the physical memory pages allocated to a first of the one or more virtual machines onto a backup device, that marks the first subset of physical memory pages as read-only while the data stored in the first subset of the physical memory pages are being backed-up from the first subset of physical memory pages to the backup device.

In embodiments, on completion of backing-up the first subset of the physical memory pages allocated to the first virtual machine, the backup manager may further journal data stored in re-mapped physical memory pages of modified ones of the first subset of the physical memory pages allocated to a first of the one or more virtual machines onto the backup device, that marks the re-mapped physical memory pages as read-only while the data stored in the re-mapped physical memory pages are being journaled onto the backup device.

In embodiments, after journaling data stored in re-mapped physical memory pages for a period of time, the backup manager may further merge data stored in the re-mapped physical memory pages back into the first subset of the physical memory pages, that marks the re-mapped physical memory pages as read-only while the data stored in the re-mapped physical memory pages are being merged back into the first subset of the physical memory pages.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example computing system having the persistent memory usage and backup technology of the present disclosure, according to various embodiments, is illustrated. As shown, example computing system 100 may include one or more processors 101, each having one or more processor cores, and PMEM 102 having a number of physical memory pages, configured to host operation of one or more virtual machines 106. Computing system 100 may further include virtual machine manager (VMM) 104 configured to manage operation of VMs 106. In embodiments, PMFM 102 may be byte addressable, and have capacity in excess of hundreds of gigabytes.

Each VM 106 may include applications 112 and guest OS 114. Guest OS 114 may include a PMEM aware file system 116 configured to enable applications 112 to read and write data into PMEM 102. In embodiments, applications 112 and guest OS 114 may read and write data into PMEM 102 in a granular byte addressable manner. Applications 112 may be any one of a number of applications known in the art, including e.g., performance or mission critical applications, such as databases and/or mail servers. Guest OS 114, except for PMEM aware file system 116, may be any one of a number of OS known in the art, e.g., the Linux OS. PMEM aware file system 116 is not part of the subject matter of the present disclosure, and is not an essential element of the PMEM computing technique of the present disclosure, accordingly will not be further described.

VMM 104, in embodiments, may include page table (PT) 122, memory manager 124 and backup manager 126. Page table 122 may be configured to map the virtual memory pages of vPMEM of VM 106 to the physical memory pages of PMEM 102. In embodiments, page table 122 may include a number of multiple level mappings that directly map the virtual memory pages of vPMEM of VM 106 to the physical memory pages of PMEM 102, such as an extended page table (EPT) a nested page table (NPT), known in the art. In alternate embodiments, page table 122 may include multiple tables with mappings that directly map the virtual address of VM 106 to the physical memory pages of PMEM 102, such as, the employment of shadow tables. In embodiments, page table 122 may be implemented in hardware, software or combination thereof. The page table 122 may use page table translation entries of various page sizes, such as 4 KB pages in some embodiments, and/or 2 MB pages in other embodiments. The page table translation entries may also be implemented in any one of a number of formats of translations supported by the hardware.

For ease of understanding, the remainder of the disclosure will be primarily described in the context of direct mapping of the virtual memory pages of vPMEM of VM 106 to the physical memory pages of PMEM 102, however, the streamlined description should not be construed as limiting on the present disclosure.

Memory manager 124 may be configured to manage allocation of the physical memory pages of PMEM 102 to VM 106, and their accesses, including management of page table 122. In particular, memory manager 124 may be configured with a copy-on write mechanism to service write instructions that write to virtual memory pages of the vPMEM of VM 106 mapped to physical memory pages of PMEM 102 that are designated or marked (e.g., via the mappings) as read-only. Resultantly, backup manager 126 may leverage on the copy-on-write mechanism of memory manager 124, and backup data of applications 112 and guest OS 114 of VM 106 stored in PMEM 102 onto a backup device (e.g., one of I/O devices 103, such as a tape drive or a disk drive) over an extended period of time (due to the large volume), while applications 112 and guest OS 114 substantially continue to operate. These and other aspects will be described more fully below with additional references to FIGS. 2-5.

Backup manager 126, as alluded to in the preceding paragraph, may be configured to leverage the copy-on-write mechanism of memory manager 124 and backup data of applications 112 and guest OS 114 of VM 106 stored in PMEM 102, while applications 112 and guest OS 114 substantially continue to operate. In embodiments, backup manager 126 may be configured to take (from time to time, e.g., nightly, weekly and so forth) a full snapshot of the data of applications 112 and guest OS 114 stored in PMEM 102. In other embodiments, backup manager 126 may be further configured to journal subsequent modifications to the backed-up data in "temporary holding" physical memory pages of PMEM 102, after the taking of a snapshot has started. Further, in still other embodiments, backup manager 126 may be configured to merge the new data from the "temporary holding" physical memory pages of PMEM 102, back into the "original" physical memory pages of PMEM 102, after journaling has been performed for a period of time (resulting in a relatively large number of re-mappings and/or re-re-mappings). These and other aspects will also be described more fully below with additional references to FIGS. 2-5.

Before further describing the PMEM computing technique of the present disclosure, it should be noted that while for ease of understanding, page table 122, memory manager 124 and backup manager 126 are all being described as part of VMM 104. However, the description is not to be read as limiting on the present disclosure. In alternate embodiments, one or more of page table 122, memory manager 124 and backup manager 126, may be disposed outside of VMM 104. For example, in some hardware implementations of page table 122, page table 122 may be considered as outside VMM 104. Similarly, in some embodiments, backup manager 126 may be implemented in a service VM 106, outside VMM 104.

Further, I/O devices 103 and PMEM 102 may be co-located or remotely located from each other. For examples, in some embodiments, some of I/O devices 103, such as the tape drives or disk drives used as backup devices may be remotely disposed from PMFM 102, and accessed through a resident network interface of I/O devices 103, via one or more wired/wireless private and/or public networks, including, e.g., the Internet.

Except for the copy-on-write mechanism of memory manager 124 and the manner backup manager 126 leverages the copy-on-write mechanism of memory manager 124 to backup data of applications 112 and guest OS 114 of VM 106 stored in PMEM 102, to enable large capacity, high speed, byte addressable PMEM to be used for performance and/or mission critical applications that substantially continue to operate while the backup is being performed, computing system 100 may otherwise be any one of a number of known computing systems known in the art, including but are not limited any one of a number of desktop or server computers. For ease of understanding, the remainder of the disclosure will be primarily described in the context of backing up data of applications 112 of VM 106 stored in PMEM 102, as opposed to repeatedly refer to "data of applications 112 and guest OS 114 of VM 106 stored in PMEM 102;" however, it should be understood the description is meant to cover "data of both applications 112 and guest OS 114 of VM 106 stored in PMEM 102."

Figure 2:
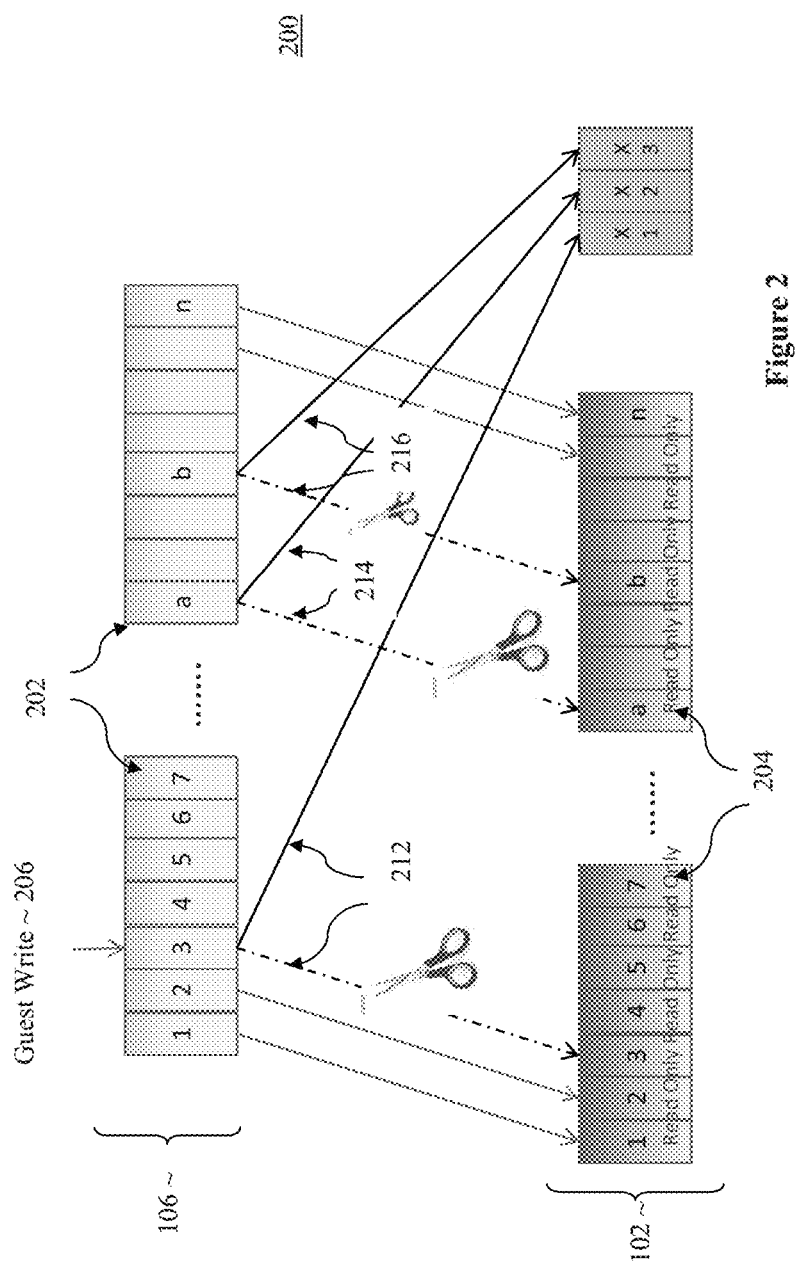
FIG. 2 illustrates the copy-on-write mechanism of the memory manager in further detail, according to various embodiments.

Referring now to FIG. 2 wherein the copy-on-write mechanism of the memory manager, according to various embodiments, is illustrated. As shown, a number of read-writable virtual memory pages (1 through n) 202 of a VM 106 may be mapped to a corresponding number of read-writable physical memory pages (1 through n) 204 of PMEM 102 that have been temporarily designated or marked (e.g., through their mappings) as read-only. The temporal read-only designation/marking may have been made to override the original read-write access permissions, e.g., for the purpose of backing up the physical memory pages (1 through n) 204 of PMEM 102. The original set of access permissions may be stored in a working mapping data set (not shown), e.g., an INITIAL_MAP_TABLE, while the access permissions are temporarily altered.

When a guest application 112 of the VM 106 writes 206 to one of these virtual memory pages 202, during this time period, memory manager 124 would allocate a temporary corresponding physical memory page, copy the data in the previous physical memory page to the temporary corresponding physical memory page, update the mapping to map the virtual memory page to the newly allocated temporary corresponding physical memory page (with the original access permissions), and cause the new data to be written into the temporary corresponding physical memory page instead.

For example, when a guest application 112 of the VM 106 writes 206 to virtual memory page #3 of virtual memory pages 202, a fault may happen due to access permission violation, and the memory manager 124 may be invoked for the copy-on-write (COW) process. The memory manager 124, on invocation, may allocate a temporary corresponding physical memory page x1, copy the data in the previous physical memory page #3 of physical memory pages 204 to the temporary corresponding physical memory page x1, and update the mapping 212 in page table 122 to map the virtual memory page #3 of virtual memory pages 202 to the newly allocated temporary corresponding physical memory page x1 with the original access permission (i.e., read-write permission of the original mapping 212). Thereafter, memory manager 124 may emulate the write instruction to write the new data into the temporary corresponding physical memory page x1, advance the guest VM's instruction pointer (IP), and resume the guest VM. Alternatively, memory manager 124 may resume the execution of the guest VM without advancement of the guest VM's IP to let the guest VM re-execute the write instruction.

As a further example, when a guest application 112 of the VM 106 writes 206 to virtual memory pages #a of virtual memory pages 202, a fault may likewise happen due to access permission violation, and the memory manager 124 may be invoked for the COW process. The memory manager 124, on invocation, may allocate a temporary corresponding physical memory page x2, copy the data in the previous physical memory page #a of physical memory pages 204 to the temporary corresponding physical memory page x2, and update the mapping 214 in page table 122 to map the virtual memory page #a of virtual memory pages 202 with the original access permission. Thereafter, memory manager 124 may emulate the write instruction to write the new data into the newly allocated temporary corresponding physical memory page x2, advance the guest VM's IP and resume the guest VM. Alternatively, memory manager 124 may resume the execution of the guest VM without advancement of the guest VM's IP to let the guest VM re-execute the write instruction.

As still another example, when a guest application 112 of the VM 106 writes 206 to virtual memory pages #b of virtual memory pages 202, a fault may likewise happen due to access permission violation, and the memory manager 124 may be invoked for the copy-on-write process. The memory manager 124, on invocation, may allocate a temporary corresponding physical memory page x3, copy the data in the previous physical memory page #b of physical memory pages 204 to the temporary corresponding physical memory page x3, and update the mapping 216 in page table 122 to map the virtual memory page #b of virtual memory pages 202 with the original access permission. Thereafter, memory manager 124 may emulate the write instruction to write the new data into the newly allocated temporary corresponding physical memory page x3, advance the guest VM's IP and resume the guest VM. Alternatively, memory manager 124 may resume the execution of the guest VM without advancement of the guest VM's IP to let the guest VM re-execute the write instruction.

Note that while for ease of understanding, the temporary corresponding physical memory pages x1, x2, x3 are illustrated as having the same page size as physical memory pages 1 through n, 204, since PMEM is byte addressable, in alternate embodiments, the re-mapping may be performed in more granular manner with the temporary corresponding physical memory pages x1, x2, x3 having different page sizes (e.g., 4 KB) than physical memory pages 1 through n, 204 (e.g., 2 MB). Or it may use multiples smaller temporary corresponding physical memory pages y1 . . . yn to replace an original larger physical memory page.

Figure 3:
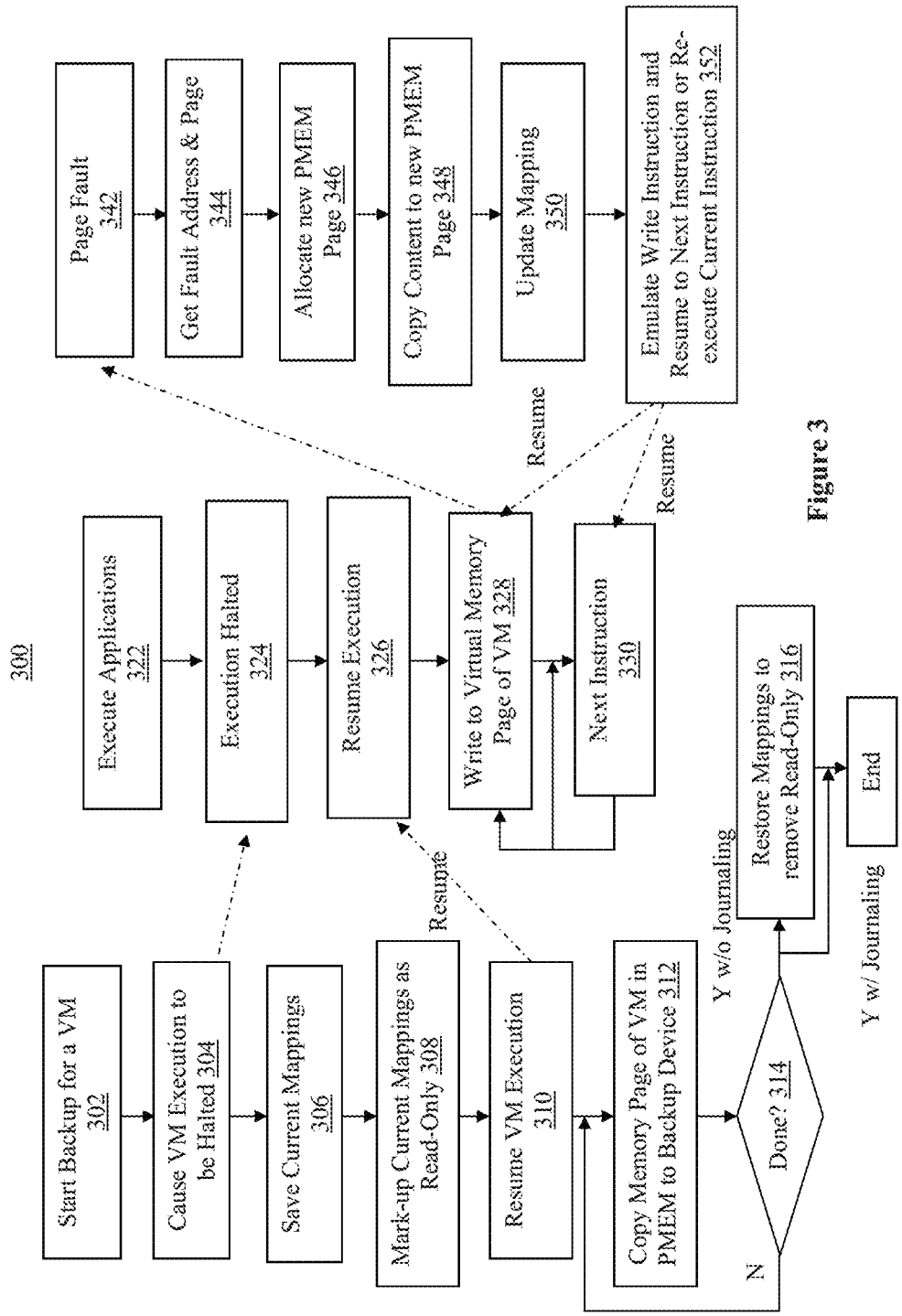
FIG. 3 illustrates an example process for creating a backup snapshot of the data of a virtual machine stored in the persistent memory, according to various embodiments.

Referring now to FIG. 3, wherein an example process for creating a backup snapshot of the data of a VM stored in the persistent memory, according to various embodiments, is illustrated. As shown, process 300 for creating a backup snapshot of the data of a VM stored in the persistent memory may include operations performed in blocks 302-352. The operations in blocks 302-316 may be performed e.g., by backup manger 126, while operations in blocks 342-352 may be performed e.g., by memory manager 124. The operations in blocks 322-330 may be performed e.g., by VM 106.

Process 300 may start at block 302. At block 302, a backup operation to create a snapshot of the data a VM stored in the PMEM may be started. Next, at block 304, execution of the VM may be halted. In embodiments, the execution of a VM may be halted by interrupting all the virtual processors of the VM. Then, at block 306, while execution of the VM is halted, current mappings of the VM's virtual memory pages to the physical memory pages of the PMEM may be copied from the page table and saved into a working mapping data structure (e.g., an INITIAL_MAP_TABLE in some working storage in system memory). Next, at block 308, the current mappings of the VM's vPMEM's virtual memory pages to the physical memory pages of the PMEM in the page table may be marked to designate these physical memory pages as read-only. Thereafter, at block 310, execution of the VM may be resumed. It will be understood that only a relative small amount of time is required to copy and save the current mappings from the page table into the working mapping data structure, and thereafter, mark the mappings to indicate read-only. The impact on the performance of the applications of the VM will be negligible. Effectively, the applications of the VM appear to continue to operate.

From block 310, process 300 may proceed to block 312. At block 312, data of the VM stored in the PMEM may be copied from the PMEM onto a backup device, one or more pages at a time. At block 314, a determination may be made on whether all physical memory pages with data of the VM stored therein have been copied from the PMEM onto the backup device. If not all physical memory pages with data of the VM have been copied, the operations at block 312 may be repeated as long as necessary until all physical memory pages with data of the VM have been copied from PMEM onto a backup device. As described earlier, for large capacity PMEM supporting performance or mission critical applications such as databases or mail servers, the copying of all the physical memory pages of PMEM with data of the VM may take some time.

Eventually, on completion of copying all physical memory pages of PMEM with data of the VM, process 300 may terminate or proceed to block 316 first before terminate. Note that at this time, some of the mappings, for those backed-up physical memory pages addressed by write instructions during the backup will be mapping the affected virtual memory pages to the "temporary holding" physical memory pages and with their original access permissions restored already, as described earlier with references to FIG. 2. For embodiments where journaling will be practiced (to be described with references to FIG. 4), process 300 may proceed to terminate, leaving physical memory pages of PMEM not having been written to and re-mapped to continue to be designated/marked as read-only. However, for embodiments where journaling will not be practiced, process 300 may proceed to block 316, where the original access permissions of the physical memory pages of PMEM not having been written to and re-mapped, may be restored (using the mapping information saved in the working mapping data structure).

Additionally, for embodiments where journaling is not practiced, or for embodiments where journaling is practiced, but merging is not practiced, after block 314, the physical memory pages that have been re-mapped may be recycled for reallocation for other use (not shown).

Meanwhile, as illustrated, initially at block 322, the applications of the VM which data in the PMEM are being backed-up are executing. Next, in response to the VM being halted (block 304), at block 324, execution of the applications of the VM is temporarily halted. Then, at block 326, in response to the resumption (block 310), at block 326, execution of the applications of the VM is resumed. At block 328, a write instruction to a virtual memory page of the VM may be encountered. In response, a page fault may be generated, with execution trapped and transferred, e.g., to the VMM and the memory manager.

At block 342, the write address and the virtual and physical memory pages involved may be obtained. Next at block 346, a "temporary holding" new physical memory page may be allocated, as described earlier. Then at 348, content in the "original" physical memory page (e.g., physical memory page #3 of FIG. 2) may be copied into the new "temporary holding" physical memory page being allocated (e.g., physical memory page x1 of FIG. 2). At block 350, the mapping may be updated to map the virtual memory page to the new "temporary holding" physical memory page, with the saved initial access permission. Then, at block 352, the memory manager may either emulate the write instruction and resume to the next instruction of the application of the VM (block 330), or simply transfer execution back to the current instruction of the application of the VM to re-execute, i.e. the write instruction that triggered the page fault (block 328).

Either case, at block 328 (transfer back), or block 352 (emulation), the write instruction, by virtual of the re-mapping, writes the new data into the temporary holding" physical memory page (such as, x1, x2 or x3 of FIG. 2). On execution at block 328 or emulation of the execution at block 352, process 300 may proceed to block 330. At block 330, a next instruction may be executed. Thereafter, the execution may continue at block 330 again, with more non-write instructions and/or write instructions to those addresses which are re-mapped to temporary holding pages without additional faulting, or at block 328 again, when another write instruction to a non-re-mapped to temporary holding pages, is encountered, while the backup is still in progress (or even after completion, if journaling is practiced). In embodiments where it is acceptable to simply take successive full snapshots at scheduled intervals, e.g., nightly, weekly, and so forth, without the practice of journaling, eventually, after the backup process is completed (block 316), the execution may just continue at block 330, regardless whether the next instruction is a write instruction or not.

Figure 4:
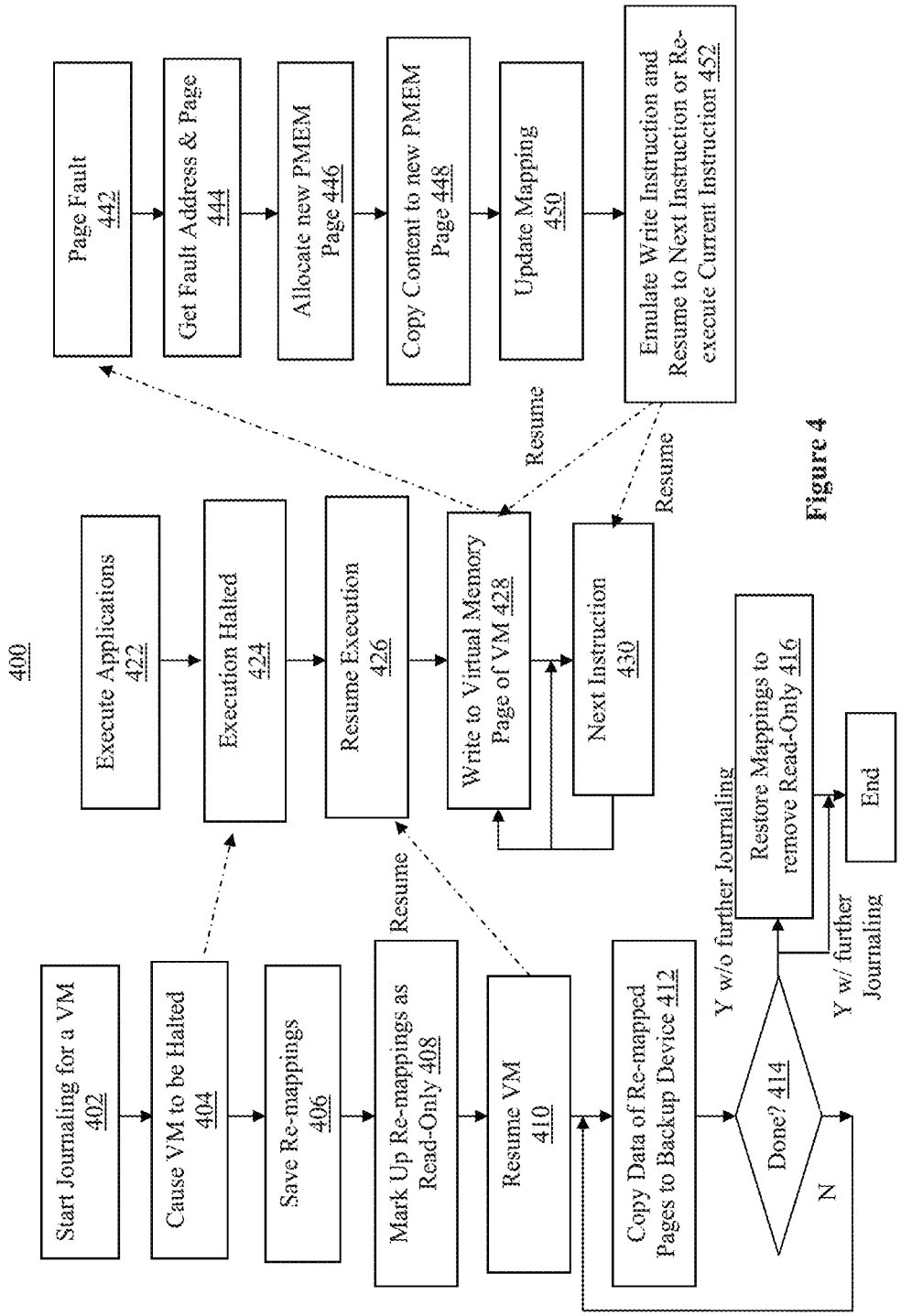
FIG. 4 illustrates an example process for journaling writes of a virtual machine to the persistent memory after a backup snapshot has started, according to various embodiments.

Referring now to FIG. 4, wherein an example process for journaling writes of a VM to the persistent memory after a backup snapshot has started, according to various embodiments, is illustrated. As shown, process 400 for journaling writes of a VM to the persistent memory after a backup snapshot has been taken may comprise of operations performed at blocks 402-452. Similar to process 300, operations at blocks 402-416 may be performed by e.g., backup manager 126, and operations at blocks 442-452 may be performed by e.g., memory manager 124. Operations at blocks 422-430 may be performed by e.g., VM 106.

Process 400 may start at block 402. At block 402, the journaling operations for a VM having a snapshot of its data stored in the PMEM being taken and stored in an external backup storage may be started. In embodiments, process 400 may be started after the first re-mapping of a physical memory page allocated to the VM being backed up has been re-mapped. Next, at block 404, execution of the VM may be halted. In embodiments, the execution of a VM may be similarly halted by interrupting all the virtual processors of the VM. Then, at block 406, while execution of the VM is halted, current re-mappings of the VM's virtual memory pages to the "temporary holding" physical memory pages of the PMEM (since the last taking of a full backup snapshot) may be copied from the page table and saved into another working data structure (e.g., in some working storage in system memory). The current re-mappings of the VM's virtual memory pages to the "temporary holding" physical memory pages of the PMEM in the page table, can be recognized by detecting the difference between the page table and the earlier described initial working data structure (e.g., INITIAL_MAP_TABLE). Next, at block 408, the current re-mappings of the VM's virtual memory pages to the "temporary holding" physical memory pages of the PMEM in the page table may be marked to designate these physical memory pages as read-only. On identification, these re-mapped physical memory pages of the PMEM may be added to a list of journaling backup page list. Thereafter, at block 410, execution of the VM may be resumed. It will be understood that only a relative small amount of time is required to copy and save the current re-mappings from the page table, and thereafter, mark the re-mappings to indicate read-only. The impact on the performance of the applications of the VM will be negligible. Effectively, the applications of the VM appear to continue to operate.

From block 410, process 400 may proceed to block 412. At block 412, data of the VM stored in the re-mapped memory pages of the PMEM (as identified by the journaling backup page list) may be journal from the PMEM onto a backup device, one or more re-mapped memory pages at a time. The journal information may contain both the vPMEM page number and the new contents of the PMEM mapping with the vPMEM. At block 414, a determination may be made on whether all re-mapped physical memory pages with data of the VM stored therein (identified in the journaling backup page list) have been journal from the PMEM onto the backup device. If not all physical memory pages with data of the VM (identified in the journaling backup page list) have been journal, the operations at block 412 may be repeated as long as necessary until all re-mapped physical memory pages with data of the VM (identified in the journaling backup page list) have been journal from the PMEM onto the backup device.

Eventually, on completion of journaling all re-mapped physical memory pages with data of the VM (identified in the journaling backup page list), process 400 may terminate or proceed to block 416 first before terminate. Note that at this time, some of the re-mappings, for those backed-up 'temporary holding" physical memory pages addressed by write instructions during journaling will be re-re-mapping the affected virtual memory pages to new "temporary holding" physical memory pages and with their original access permissions restored already, similar to the earlier description of re-mapping. That is, operations at blocks 442-452 and operations at blocks 422-430 parallel the operations earlier described for operations at block 342-352 and operations at blocks 322-330, resulting in some of the re-mapped physical memory pages may have been further re-mapped at block 416. For example, in the course of journaling, while the re-mapping of virtual memory page #3 of FIG. 2 to "temporary holding" physical memory page x1 of FIG. 2 is marked as read-only, a write instruction may attempt to write to the read-only "temporary holding" physical memory page x1 (block 428). As earlier described, the attempt write may result in a page fault causing execution control to be transferred (block 442). In response to the page fault, the write address and the physical memory page involved may be obtained (block 444). Further, another new "temporary holding" physical memory page y1 may be allocated (block 448), and the re-mapping of virtual memory page #3 to "temporary holding" physical memory page x1 may be updated (block 450) to re-re-map virtual memory page #3 to "temporary holding" physical memory page y1 instead.

For embodiments where journaling will be continued to be practiced, process 400 may proceed to terminate, leaving the re-mapped physical memory pages of PMEM not having been written to and re-re-mapped to continue to be designated/marked as read-only. However, for embodiments where journaling may stop (e.g., another full snapshot is due), process 400 may proceed to block 416, where the original access permissions of the re-mapped physical memory pages of PMEM not having been written to and re-re-mapped, may be restored (using the mapping information saved in the additional working mapping data structure).

Additionally, for embodiments where journaling may stop (e.g., another full snapshot is due), or for embodiments where journaling will continue, but merging is not practiced, after block 414, the re-mapped physical memory pages that have been re-re-mapped may be recycled for reallocation for other use (not shown).

Figure 5:
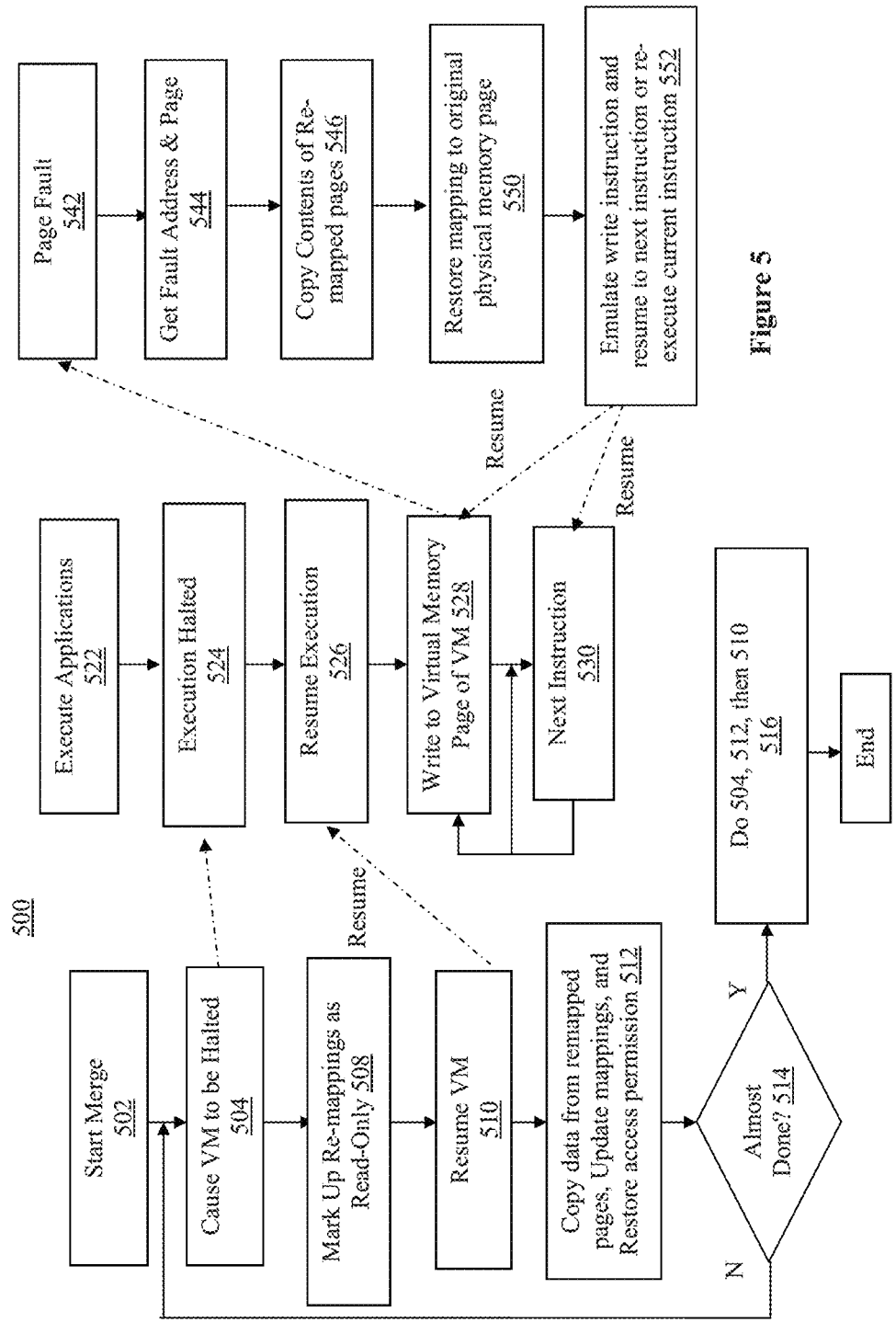
FIG. 5 illustrates an example process for merging data in the re-mapped physical memory pages back to the original physical memory pages after journaling for a period of time, according to various embodiments.

Referring now to FIG. 5 wherein an example process for merging data in the re-mapped physical memory pages back to the original physical memory pages after journaling has been performed for a while, according to various embodiments, is illustrated. As shown, process 500 merging data in the re-mapped physical memory pages back to the original physical memory pages after journaling has been performed for a period of time (resulting in a large number of re-mapping and re-re-mappings) may comprise of operations performed at blocks 502-552. Similar to processes 300 and 400, operations at blocks 502-516 may be performed by e.g., backup manager 126, and operations at blocks 542-552 may be performed by e.g., memory manager 124. Operations at blocks 522-530 may be performed by e.g., VM 106.

Process 500 may start at block 502. At block 502, the merge operations for a VM having the journaling operation performed for a period of time may start. Next, at block 504, execution of the VM may be halted. In embodiments, the execution of a VM may be similarly halted by interrupting all the virtual processors of the VM. Next, at block 508, the current re-mappings of the VM's virtual memory pages to the "temporary holding" physical memory pages of the PMEM in the page table may be marked to designate these physical memory pages as read-only. Thereafter, at block 510, execution of the VM may be resumed. It will be understood that only a relative small amount of time is required to mark the re-mappings to indicate read-only. The impact on the performance of the applications of the VM will be negligible. Effectively, the applications of the VM appear to continue to operate.

From block 510, process 500 may proceed to block 512. At block 512, data of the VM stored in the re-mapped memory pages of the PMEM may be copied from the re-mapped physical memory pages and merge back to the original physical memory pages, one or more re-mapped memory pages at a time. For example, the data stored in "temporary holding" physical memory pages x1, x2 and x3 may be copied and merged back into original physical memory pages #3, #a, and #b, respectively. At block 514, a determination may be made on whether substantially all re-mapped physical memory pages with data of the VM stored therein have been copied and merged back into their original physical memory pages, e.g., whether the number of re-mapped physical memory pages remains to be merged is less than a threshold. If the number of re-mapped physical memory pages with data of the VM to be copied and merged back to the original physical memory pages remains substantial, process 500 may return to block 504, and proceed therefrom as earlier described. If the number of re-mapped physical memory pages with data of the VM to be copied and merged back to the original physical memory pages is insubstantial (e.g., below a threshold), process 500 may proceed to block 516. At block 516, operations at block 504, 512 and 510 may be repeated, and then process 500 may end. That is, at block 516, the VM may be halted (504), the data in the remaining re-mapped physical memory pages may be copied and merged back into the original physical memory pages, the mappings in the page table updated, including restoration of the access permissions, and then the VM resumed.

Note that while for ease of understanding, the temporary corresponding physical memory pages x1, x2, x3 are illustrated as having the same page size as physical memory pages 1 through n, 204, since PMEM is byte addressable, In embodiments where the re-mappings are performed in more granular manner with the temporary corresponding physical memory pages having smaller page sizes (e.g., 4 KB) than the original physical memory pages (e.g., 2 MB), on completion of the operations earlier described for block 516, process 500 may further include the operation of merging the mappings of the smaller physical memory pages into the mappings of the larger physical memory pages, to reduce the complexity and size of the page table.

Operations at blocks 542-552 and operations at blocks 522-530 parallel the operations earlier described for operations at blocks 342-352 or 442-452 and operations at blocks 322-330 or block 422-430, respectively.

Figure 6:
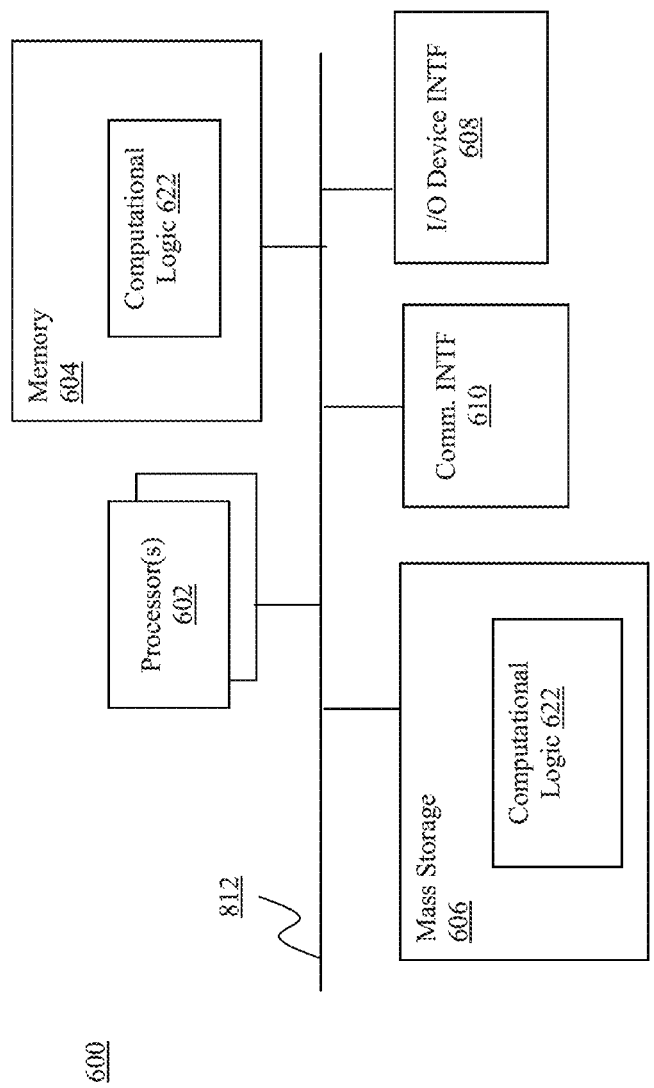
FIG. 6 illustrates an example computer system suitable for use to practice various aspects of the present disclosure, according to various embodiments.

FIG. 6 illustrates an example computer system that may be suitable for use to practice selected aspects of the present disclosure. As shown, computer 600 may include one or more processors or processor cores 602, and system memory 604. For the purpose of this application, including the claims, the term "processor" refers to a physical processor, and the terms "processors" and "processor cores" may be considered synonymous, unless the context clearly requires otherwise. Additionally, computer system 600 may include mass storage devices 606, at least one of which is a large capacity, byte addressable PMEM, like PMEM 102 of FIG. 1. In embodiments, mass storage devices 606 may include other storage devices, such as tape drive, hard drive, compact disc read-only memory (CD-ROM) and so forth), Further, computer system 600 may include input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with applications 112, guest OS 114, memory manager 124 and/or backup manager 126 earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer system 600 is used as a desktop computer or a server. Otherwise, the constitutions of elements 610-612 are known, and accordingly will not be further described.

Figure 7:
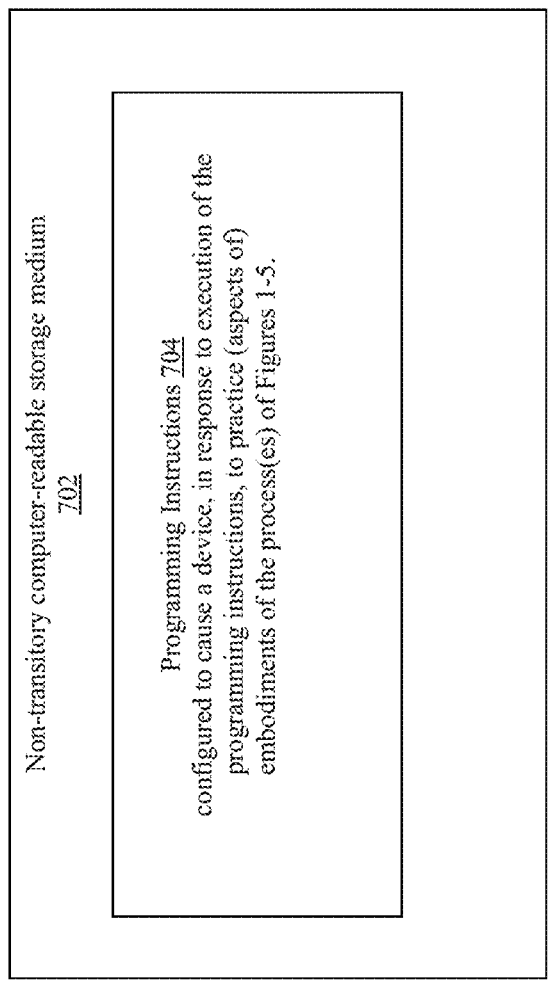
FIG. 7 illustrates a storage medium having instructions for practicing methods described with references to FIGS. 1-5, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to perform applications 112, guest OS 114, memory manager 124 and/or backup manager 126. In alternate embodiments, programming instructions 704 may be disposed on multiple computer-readable non-transitory storage media 702 instead. In alternate embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having memory manager 124 and/or backup manager 126. For one embodiment, at least one of processors 602 may be packaged together with memory having memory manager 124 and/or backup manager 126 to form a System in Package (SiP). For one embodiment, at least one of processors 602 may be integrated on the same die with memory having memory manager 124 and/or backup manager 126. For one embodiment, at least one of processors 602 may be packaged together with memory having memory manager 124 and/or backup manager 126 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for computing, comprising: one or more processors and persistent memory to host operation of one or more virtual machines; and one or more page tables to store a plurality of mappings to map a plurality of virtual memory pages of one or more virtualization of the persistent memory of the one or more virtual machines to a plurality of physical memory pages of the persistent memory allocated to the one or more virtual machines. The apparatus may further include a memory manager to manage accesses of the persistent memory that includes a copy-on-write mechanism to service write instructions that address the virtual memory pages that are mapped to the physical memory pages which mappings in the one or more page tables are marked to denote the physical memory pages as read-only.

Example 2 may be example 1, wherein the memory manager may receive an address of a physical memory page allocated to a first of the one or more virtual machines that is marked as read-only and being addressed by a write instruction to a virtual memory page mapped to the physical memory page, from a page fault handler of the first virtual machine.

Example 3 may be example 2, wherein the memory manager, on receipt of the address of the physical memory page allocated to the first virtual machine that is marked as read-only and being addressed by a write instruction to a virtual memory page mapped to the physical memory page, may allocate another physical memory page to the first virtual machine, and update the one or more page tables to map the virtual memory page of the first virtual machine previously mapped to the physical memory page for which the address was received to the newly allocated physical memory page, with an access permission of an original mapping that maps the virtual memory page to the physical memory page for which the address was received.

Example 4 may be example 3, wherein the memory manager, on re-mapping, may further emulate the write instruction to write data of the write instruction into the newly allocated physical memory page, and thereafter, return execution control to a next instruction of the first virtual machine.

Example 5 may be example 3, wherein the memory manager, on re-mapping, may return execution control to the write instruction of the first virtual machine to write data of the write instruction into the newly allocated physical memory page.

Example 6 may be example 1, further comprising a backup manager to backup data stored in a first subset of the physical memory pages allocated to a first of the one or more virtual machines onto a backup device, that marks the first subset of physical memory pages as read-only while the data stored in the first subset of the physical memory pages are being backed-up from the first subset of physical memory pages to the backup device.

Example 7 may be example 6, wherein the backup manager may first save current mappings of the one or more tables that map the virtual memory pages of the first virtual machine to the physical memory pages, and mark-up the current mappings in the one or more tables to denote the physical memory pages as read-only, before starting backing-up the data stored in the first subset of the physical memory pages onto the backup device.

Example 8 may be example 7, wherein the backup manager may cause execution of the first virtual machine to be halted before saving the current mappings, and to cause execution of the first virtual machine be resumed after the current mappings in the one or more page tables have been marked-up to denote the physical memory pages as read-only.

Example 9 may be example 8, wherein on completion of backing-up the data stored in the first subset of the physical memory pages allocated to the first virtual machine, the backup manager may restore the marked-up mappings of the first subset of the physical memory pages that have not been re-mapped to their pre-markup states, based at least in part on the saved mappings.

Example 10 may be example 6, wherein on start of backing-up the first subset of the physical memory pages allocated to the first virtual machine, the backup manager may further journal data stored in re-mapped physical memory pages of modified ones of the first subset of the physical memory pages allocated to a first of the one or more virtual machines onto the backup device, that marks the re-mapped physical memory pages as read-only while the data stored in the re-mapped physical memory pages are being journaled onto the backup device.

Example 11 may be example 10, wherein the backup manager may first save current mappings of the one or more tables, since the start of the backing-up of the first subset of the physical memory pages allocated to the first virtual machine, that map the virtual memory pages of the first virtual machine to the re-mapped physical memory pages, and mark-up the current re-mappings in the one or more tables, since the start of the backing-up of the first subset of the physical memory pages allocated to the first virtual machine, that map the virtual memory pages of the first virtual machine to the re-mapped physical memory pages, to denote the re-mapped physical memory pages as read-only, before the start of journaling the data stored in the re-mapped physical memory pages onto the backup device.

Example 12 may be example 11, wherein the backup manager may cause execution of the first virtual machine to be halted before saving the current mappings in the one or more tables, since the start of the backing-up of the first subset of the physical memory pages allocated to the first virtual machine, that map the virtual memory pages of the first virtual machine to the re-mapped physical memory pages, and to cause execution of the first virtual machine to be resumed after the current mappings in the one or more page tables, since the start of the backing-up of the first subset of the physical memory pages allocated to the first virtual machine, that map the virtual memory pages of the first virtual machine to the re-mapped physical memory pages, have been marked-up to denote the re-mapped physical memory pages as read-only.

Example 13 may be example 12, wherein on copying of the data stored in a re-mapped physical memory page, the backup manager may restore the corresponding marked-up re-mappings to the pre-markup state, based at least in part on the corresponding saved re-mappings.

Example 14 may be example 12, wherein on completion of journaling the data stored in all re-mapped physical memory pages, the backup manager may release the re-mapped physical memory pages for re-allocation.

Example 15 may be example 10, wherein after journaling data stored in re-mapped physical memory pages for a period of time, the backup manager may further merge data stored in the re-mapped physical memory pages back into the first subset of the physical memory pages, that marks the re-mapped physical memory pages as read-only while the data stored in the re-mapped physical memory pages are being merged back into the first subset of the physical memory pages.

Example 16 may be example 15, wherein the backup manager may mark-up the current re-mappings in the one or more tables to denote the re-mapped physical memory pages as read-only, before the start of merging the data stored in the re-mapped physical memory pages back into the first subset of the physical memory pages.

Example 17 may be example 16, wherein the backup manager may cause execution of the first virtual machine to be halted before marking up the current re-mappings, and to cause execution of the first virtual machine to be resumed after the current re-mappings in the one or more page tables have been marked-up to denote the re-mapped physical memory pages as read-only.

Example 18 may be example 16, wherein on copying of the data stored in the re-mapped physical memory pages back into the first subset of the physical memory pages, the backup manager may update the mappings of the one or more tables to reflect the merge back into the first subset of the physical memory pages.

Example 19 may be any one of examples 6-18 further comprising a virtual machine manager to manage hosting of the virtual machines, wherein the virtual machine manager includes the backup manager.

Example 20 may be example 19, wherein the virtual machine manager further includes the one or more page tables and the memory manager.

Example 21 may be any one of examples 1-18 further comprising a virtual machine manager to manage hosting of the virtual machines, wherein the virtual machine manager includes the one or more page tables and the memory manager.

Example 22 may be a method for computing, comprising: hosting, by one or more processors and persistent memory of a computing device, operation of one or more virtual machines; storing a plurality of mappings in one or more page tables of the computing device to map a plurality of virtual memory pages of a virtualization of the persistent memory of the one or more virtual machines to a plurality of physical memory pages of the persistent memory allocated to the one or more virtual machines; and managing accesses of the persistent memory, by a memory manager of the computing device, with a copy-on-write process to service write instructions that address the virtual memory pages mapped to the physical memory pages which mappings in the one or more page tables are marked to denote the physical memory pages as read-only.

Example 23 may be example 22, further comprising the memory manager receiving an address of a physical memory page allocated to a first of the one or more virtual machines that is marked as read-only and being addressed by a write instruction to a virtual memory page mapped to the physical memory page, from a page fault handler of the first virtual machine.

Example 24 may be example 23, further comprising the memory manager, on receipt of the address of the physical memory page allocated to the first virtual machine that is marked as read-only and being addressed by a write instruction to a virtual memory page mapped to the physical memory page, allocating another physical memory page to the first virtual machine, and updating the one or more page tables to map the virtual memory page of the first virtual machine previously mapped to the physical memory page for which the address was received to the newly allocated physical memory page, with an access permission of an original mapping that maps the virtual memory page to the physical memory page for which the address was received.

Example 25 may be example 24, further comprising the memory manager, on re-mapping, emulating the write instruction to write data of the write instruction into newly allocated physical memory page, and thereafter, returning execution control to a next instruction of the first virtual machine.

Example 26 may be example 24, further comprising the memory manager, on re-mapping, returning execution control to the write instruction of the first virtual machine to write data of the write instruction into newly allocated physical memory page.

Example 27 may be any one of examples 22-26, further comprising backing up, by a backup manager of the computing device, data stored in a first subset of the physical memory pages allocated to a first of the one or more virtual machines onto a backup device, that marks the first subset of physical memory pages as read-only while the data stored in the first subset of the physical memory pages are being backed-up from the first subset of physical memory pages to the backup device.

Example 28 may be example 27, wherein backing up may comprise the backup manager first saving current mappings of the one or more tables that map the virtual memory pages of the first virtual machine to the physical memory pages, and marking-up the current mappings in the one or more tables to denote the physical memory pages as read-only, before start backing-up the data stored in the first subset of the physical memory pages onto the backup device.

Example 29 may be example 28, wherein backing up may further comprise the backup manager causing execution of the first virtual machine to be halted before saving the current mappings, and to cause execution of the first virtual machine to be resumed after the current mappings in the one or more page tables have been marked-up to denote the physical memory pages as read-only.

Example 30 may be example 29, wherein backing up may further comprise on completion of backing-up the data stored in the first subset of the physical memory pages allocated to the first virtual machine, the backup manager restoring the marked-up mappings of the first subset of the physical memory pages that have not been re-mapped to their pre-markup states, based at least in part on the saved mappings.

Example 31 may be example 27, further comprising on start of backing-up the first subset of the physical memory pages allocated to the first virtual machine, the backup manager journaling data stored in re-mapped physical memory pages of modified ones of the first subset of the physical memory pages allocated to a first of the one or more virtual machines onto the backup device, that marks the re-mapped physical memory pages as read-only while the data stored in the re-mapped physical memory pages are being journaled onto the backup device.

Example 32 may be example 31, wherein journaling may comprise the backup manager first saving current mappings of the one or more tables, since the start of the backing-up of the first subset of the physical memory pages allocated to the first virtual machine, that map the virtual memory pages of the first virtual machine to the re-mapped physical memory pages, and marking-up the current re-mappings in the one or more tables, since the start of the backing-up of the first subset of the physical memory pages allocated to the first virtual machine, that map the virtual memory pages of the first virtual machine to the re-mapped physical memory pages, to denote the re-mapped physical memory pages as read-only, before start journaling the data stored in the re-mapped physical memory pages onto the backup device.

Example 33 may be example 32, wherein journaling may further comprise the backup manager causing execution of the first virtual machine to be halted before saving the current mappings in the one or more tables, since the start of the backing-up of the first subset of the physical memory pages allocated to the first virtual machine, that map the virtual memory pages of the first virtual machine to the re-mapped physical memory pages, and causing execution of the first virtual machine to be resumed after the current mappings in the one or more page tables, since the start of the backing-up of the first subset of the physical memory pages allocated to the first virtual machine, that map the virtual memory pages of the first virtual machine to the re-mapped physical memory pages, have been marked-up to denote the re-mapped physical memory pages as read-only.

Example 34 may be example 33, wherein journaling may further comprise on copying of the data stored in a re-mapped physical memory page, the backup manager restoring the corresponding marked-up re-mappings to the pre-markup state, based at least in part on the corresponding saved re-mappings.

Example 35 may be example 33, wherein journaling may further comprise on completion of journaling the data stored in all re-mapped physical memory pages, the backup manager releasing the re-mapped physical memory pages for re-allocation.

Example 36 may be example 31, further comprising after journaling data stored in re-mapped physical memory pages for a period of time, the backup manager merging data stored in the re-mapped physical memory pages back into the first subset of the physical memory pages, that marks the re-mapped physical memory pages as read-only while the data stored in the re-mapped physical memory pages are being merged back into the first subset of the physical memory pages.

Example 37 may be example 36, wherein merging may comprise the backup manager marking-up the current re-mappings in the one or more tables to denote the re-mapped physical memory pages as read-only, before start merging the data stored in the re-mapped physical memory pages back into the first subset of the physical memory pages.

Example 38 may be example 37, wherein merging may further comprise the backup manager causing execution of the first virtual machine to be halted before marking up the current re-mappings, and causing execution of the first virtual machine to be resumed after the current re-mappings in the one or more page tables have been marked-up to denote the re-mapped physical memory pages as read-only.

Example 39 may be example 37, wherein merging may further comprise on copying of the data stored in the re-mapped physical memory pages back into the first subset of the physical memory pages, the backup manager updating the mappings of the one or more tables to reflect the merge back into the first subset of the physical memory pages.

Example 40 may be one or more computer-readable media comprising instructions that cause a computing device having a persistent memory, in response to execution of the instructions by a processor of the computing device, to: store a plurality of mappings in one or more page tables of the computing device to map a plurality of virtual memory pages of a virtualization of the persistent memory of one or more virtual machines hosted by the processor and the persistent memory, to a plurality of physical memory pages of the persistent memory allocated to the one or more virtual machines; and manage accesses of the persistent memory with a copy-on-write process to service write instructions that address the virtual memory pages mapped to the physical memory pages which mappings in the one or more page tables are marked to denote the physical memory pages as read-only.

Example 41 may be example 40, wherein the computing device may be further caused to receive an address of a physical memory page allocated to a first of the one or more virtual machines that is marked as read-only and being addressed by a write instruction to a virtual memory page mapped to the physical memory page, from a page fault handler of the first virtual machine.

Example 42 may be example 41, wherein the computing device may be further caused, on receipt of the address of the physical memory page allocated to the first virtual machine that is marked as read-only and being addressed by a write instruction to a virtual memory page mapped to the physical memory page, allocate another physical memory page to the first virtual machine, and update the one or more page tables to map the virtual memory page of the first virtual machine previously mapped to the physical memory page for which the address was received to the newly allocated physical memory page, with an access permission of an original mapping that maps the virtual memory page to the physical memory page for which the address was received.

Example 43 may be example 42, wherein the computing device may be further caused, on re-mapping, emulate the write instruction to write data of the write instruction into newly allocated physical memory page, and thereafter, return execution control to a next instruction of the first virtual machine.

Example 44 may be example 42, wherein the computing device may be further caused, on re-mapping, return execution control to the write instruction of the first virtual machine to write data of the write instruction into newly allocated physical memory page.

Example 45 may be example 40, wherein the computing device may be further caused to backup data stored in a first subset of the physical memory pages allocated to a first of the one or more virtual machines onto a backup device, that marks the first subset of physical memory pages as read-only while the data stored in the first subset of the physical memory pages are being backed-up from the first subset of physical memory pages to the backup device.

Example 46 may be example 45, wherein the computing device may be further caused to first save current mappings of the one or more tables that map the virtual memory pages of the first virtual machine to the physical memory pages, and mark-up the current mappings in the one or more tables to denote the physical memory pages as read-only, before start backing-up the data stored in the first subset of the physical memory pages onto the backup device.

Example 47 may be example 46, wherein the computing device may be further caused to cause execution of the first virtual machine to be halted before saving the current mappings, and to cause execution of the first virtual machine to be resumed after the current mappings in the one or more page tables have been marked-up to denote the physical memory pages as read-only.

Example 48 may be example 47, wherein the computing device may be further caused to, on completion of backing-up the data stored in the first subset of the physical memory pages allocated to the first virtual machine, restore the marked-up mappings of the first subset of the physical memory pages that have not been re-mapped to their pre-markup states, based at least in part on the saved mappings.

Example 49 may be example 45, wherein the computing device may be further caused to, on start of backing-up the first subset of the physical memory pages allocated to the first virtual machine, journal data stored in re-mapped physical memory pages of modified ones of the first subset of the physical memory pages allocated to a first of the one or more virtual machines onto the backup device, that marks the re-mapped physical memory pages as read-only while the data stored in the re-mapped physical memory pages are being journaled onto the backup device.

Example 50 may be example 49, wherein the computing device may be further caused to first save current mappings of the one or more tables, since the start of the backing-up of the first subset of the physical memory pages allocated to the first virtual machine, that map the virtual memory pages of the first virtual machine to the re-mapped physical memory pages, and mark-up the current re-mappings in the one or more tables, since the start of the backing-up of the first subset of the physical memory pages allocated to the first virtual machine, that map the virtual memory pages of the first virtual machine to the re-mapped physical memory pages, to denote the re-mapped physical memory pages as read-only, before start journaling the data stored in the re-mapped physical memory pages onto the backup device.

Example 51 may be example 50, wherein the computing device may be further caused to cause execution of the first virtual machine to be halted before saving the current mappings in the one or more tables, since the start of the backing-up of the first subset of the physical memory pages allocated to the first virtual machine, that map the virtual memory pages of the first virtual machine to the re-mapped physical memory pages, and to cause execution of the first virtual machine to be resumed after the current mappings in the one or more page tables, since the start of the backing-up of the first subset of the physical memory pages allocated to the first virtual machine, that map the virtual memory pages of the first virtual machine to the re-mapped physical memory pages, have been marked-up to denote the re-mapped physical memory pages as read-only.

Example 52 may be example 51, wherein the computing device may be further caused to, on copying of the data stored in a re-mapped physical memory page, restore the corresponding marked-up re-mappings to the pre-markup state, based at least in part on the corresponding saved re-mappings.

Example 53 may be example 51, wherein the computing device may be further caused to, on completion of journaling the data stored in all re-mapped physical memory pages, release the re-mapped physical memory pages for re-allocation.

Example 54 may be example 49, wherein the computing device may be further caused to, after journaling data stored in re-mapped physical memory pages for a period of time, merge data stored in the re-mapped physical memory pages back into the first subset of the physical memory pages, that marks the re-mapped physical memory pages as read-only while the data stored in the re-mapped physical memory pages are being merged back into the first subset of the physical memory pages.

Example 55 may be example 54, wherein the computing device may be further caused to mark-up the current re-mappings in the one or more tables to denote the re-mapped physical memory pages as read-only, before start merging the data stored in the re-mapped physical memory pages back into the first subset of the physical memory pages.

Example 56 may be example 55, wherein the computing device may be further caused to cause execution of the first virtual machine to be halted before marking up the current re-mappings, and to cause execution of the first virtual machine to be resumed after the current re-mappings in the one or more page tables have been marked-up to denote the re-mapped physical memory pages as read-only.

Example 57 may be example 55, wherein on copying of the data stored in the re-mapped physical memory pages back into the first subset of the physical memory pages, the computing device may be further caused to update the mappings of the one or more tables to reflect the merge back into the first subset of the physical memory pages.

Example 58 may be an apparatus for computing, comprising: means, including one or more processors and persistent memory, for hosting operation of one or more virtual machines; means for storing one or more page tables having a plurality of mappings that map a plurality of virtual memory pages of a virtualization of the persistent memory of the one or more virtual machines to a plurality of physical memory pages of the persistent memory allocated to the one or more virtual machines; and means for managing accesses of the persistent memory with a copy-on-write process to service write instructions that address the virtual memory pages mapped to the physical memory pages which mappings in the one or more page tables are marked to denote the physical memory pages as read-only.

Example 59 may be example 58, wherein means for managing accesses of the persistent memory may comprise means for receiving an address of a physical memory page allocated to a first of the one or more virtual machines that is marked as read-only and being addressed by a write instruction to a virtual memory page mapped to the physical memory page, from a page fault handler of the first virtual machine.

Example 60 may be example 59, wherein means for managing accesses of the persistent memory may further comprise means for, on receipt of the address of the physical memory page allocated to the first virtual machine that is marked as read-only and being addressed by a write instruction to a virtual memory page mapped to the physical memory page, allocating another physical memory page to the first virtual machine, and updating the one or more page tables to map the virtual memory page of the first virtual machine previously mapped to the physical memory page for which the address was received to the newly allocated physical memory page, with an access permission of an original mapping that maps the virtual memory page to the physical memory page for which the address was received.

Example 61 may be example 60, wherein means for managing accesses of the persistent memory may further comprise means for, on re-mapping, emulating the write instruction to write data of the write instruction into newly allocated physical memory page, and thereafter, returning execution control to a next instruction of the first virtual machine.

Example 62 may be example 60, wherein means for managing accesses of the persistent memory may further comprise means for, on re-mapping, returning execution control to the write instruction of the first virtual machine to write data of the write instruction into newly allocated physical memory page.

Example 63 may be any one of examples 58-62, further comprising means for backing up data stored in a first subset of the physical memory pages allocated to a first of the one or more virtual machines onto a backup device, that marks the first subset of physical memory pages as read-only while the data stored in the first subset of the physical memory pages are being backed-up from the first subset of physical memory pages to the backup device.

Example 64 may be example 63, wherein means for backing up comprise means for first saving current mappings of the one or more tables that map the virtual memory pages of the first virtual machine to the physical memory pages, and means for marking-up the current mappings in the one or more tables to denote the physical memory pages as read-only, before start backing-up the data stored in the first subset of the physical memory pages onto the backup device.

Example 65 may be example 64, wherein means for backing up may further comprise means for causing execution of the first virtual machine to be halted before saving the current mappings, and to cause execution of the first virtual machine to be resumed after the current mappings in the one or more page tables have been marked-up to denote the physical memory pages as read-only.

Example 66 may be example 65, wherein means for backing up may further comprise means for, on completion of backing-up the data stored in the first subset of the physical memory pages allocated to the first virtual machine, restoring the marked-up mappings of the first subset of the physical memory pages that have not been re-mapped to their pre-markup states, based at least in part on the saved mappings.

Example 67 may be example 63, wherein means for backing up may further comprise means for, on start of backing-up the first subset of the physical memory pages allocated to the first virtual machine, journaling data stored in re-mapped physical memory pages of modified ones of the first subset of the physical memory pages allocated to a first of the one or more virtual machines onto the backup device, that marks the re-mapped physical memory pages as read-only while the data stored in the re-mapped physical memory pages are being journaled onto the backup device.

Example 68 may be example 67, wherein means for journaling comprises means for first saving current mappings of the one or more tables, since the start of the backing-up of the first subset of the physical memory pages allocated to the first virtual machine, that map the virtual memory pages of the first virtual machine to the re-mapped physical memory pages, and means for marking-up the current re-mappings in the one or more tables, since the start of the backing-up of the first subset of the physical memory pages allocated to the first virtual machine, that map the virtual memory pages of the first virtual machine to the re-mapped physical memory pages, to denote the re-mapped physical memory pages as read-only, before start journaling the data stored in the re-mapped physical memory pages onto the backup device.

Example 69 may be example 68, wherein means for journaling may further comprise means for causing execution of the first virtual machine to be halted before saving the current mappings in the one or more tables, since the start of the backing-up of the first subset of the physical memory pages allocated to the first virtual machine, that map the virtual memory pages of the first virtual machine to the re-mapped physical memory pages, and means for causing execution of the first virtual machine to be resumed after the current mappings in the one or more page tables, since the start of the backing-up of the first subset of the physical memory pages allocated to the first virtual machine, that map the virtual memory pages of the first virtual machine to the re-mapped physical memory pages, have been marked-up to denote the re-mapped physical memory pages as read-only.

Example 70 may be example 69, wherein means for journaling may further comprise means for, on copying of the data stored in a re-mapped physical memory page, restoring the corresponding marked-up re-mappings to the pre-markup state, based at least in part on the corresponding saved re-mappings.

Example 71 may be example 69, wherein means for journaling may further comprise means for, on completion of journaling the data stored in all re-mapped physical memory pages, releasing the re-mapped physical memory pages for re-allocation.

Example 72 may be example 67, wherein means for backing up comprises means for, after journaling data stored in re-mapped physical memory pages for a period of time, merging data stored in the re-mapped physical memory pages back into the first subset of the physical memory pages, that marks the re-mapped physical memory pages as read-only while the data stored in the re-mapped physical memory pages are being merged back into the first subset of the physical memory pages.

Example 73 may be example 72, wherein means for merging comprise means for marking-up the current re-mappings in the one or more tables to denote the re-mapped physical memory pages as read-only, before start merging the data stored in the re-mapped physical memory pages back into the first subset of the physical memory pages.

Example 74 may be example 73, wherein means for merging may further comprises the backup manager causing execution of the first virtual machine to be halted before marking up the current re-mappings, and causing execution of the first virtual machine be resumed after the current re-mappings in the one or more page tables have been marked-up to denote the re-mapped physical memory pages as read-only.

Example 75 may be example 73, wherein means for merging may further comprise means for, on copying of the data stored in the re-mapped physical memory pages back into the first subset of the physical memory pages, updating the mappings of the one or more tables to reflect the merge back into the first subset of the physical memory pages.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more processors and persistent memory to host operation of one or more virtual machines;
one or more page tables to store a plurality of mappings to map a plurality of virtual memory pages of one or more virtualization of the persistent memory of the one or more virtual machines to a plurality of physical memory pages of the persistent memory allocated to the one or more virtual machines; and
a backup manager to back up data stored in a first subset of the physical memory pages allocated to a first of the one or more virtual machines onto a backup device, which marks the first subset of physical memory pages as read-only while the data stored in the first subset of the physical memory pages are being backed up from the first subset of physical memory pages to the backup device;
wherein the backup manager is arranged to first save current mappings of the one or more page tables, since a start of the backing up of the first subset of the physical memory pages allocated to the first virtual machine, that map the virtual memory pages of the first virtual machine to the re-mapped physical memory pages, and mark up the current re-mappings in the one or more page tables, since the start of the backing up of the first subset of the physical memory pages allocated to the first virtual machine, that map the virtual memory pages of the first virtual machine to the re-mapped physical memory pages, to denote the re-mapped physical memory pages as read-only, before journaling the data stored in the re-mapped physical memory pages onto the backup device.

2. The apparatus of claim 1, further comprising a memory manager to manage accesses of the persistent memory that includes a copy-on-write mechanism to service write instructions that address the virtual memory pages that are mapped to the physical memory pages, which mappings in the one or more page tables are marked to denote the physical memory pages as read-only; wherein the memory manager is to receive an address of a physical memory page allocated to a first of the one or more virtual machines that is marked as read-only and being addressed by a write instruction to a virtual memory page mapped to the physical memory page, from a page fault handler of the first virtual machine.

3. The apparatus of claim 2, wherein the memory manager, on receipt of the address of the physical memory page allocated to the first virtual machine that is marked as read-only and being addressed by a write instruction to a virtual memory page mapped to the physical memory page, is to allocate another physical memory page to the first virtual machine, and update the one or more page tables to map the virtual memory page of the first virtual machine previously mapped to the physical memory page for which the address was received to the newly allocated physical memory page, with an access permission of an original mapping that maps the virtual memory page to the physical memory page for which the address was received.

4. The apparatus of claim 3, wherein the memory manager, on re-mapping, is to further emulate the write instruction to write data of the write instruction into the newly allocated physical memory page, and thereafter, return execution control to a next instruction of the first virtual machine.

5. The apparatus of claim 3, wherein the memory manager, on re-mapping, is to return execution control to the write instruction of the first virtual machine to write data of the write instruction into the newly allocated physical memory page.

6. The apparatus of claim 1, wherein the backup manager is to first save current mappings of the one or more page tables that map the virtual memory pages of the first virtual machine to the physical memory pages, and mark up the current mappings in the one or more page tables to denote the physical memory pages as read-only, before starting to back up the data stored in the first subset of the physical memory pages onto the backup device.

7. The apparatus of claim 6, wherein the backup manager is to cause execution of the first virtual machine to be halted before saving the current mappings, and to cause execution of the first virtual machine be resumed after the current mappings in the one or more page tables have been marked up to denote the physical memory pages as read-only.

8. The apparatus of claim 7, wherein on completion of backing up the data stored in the first subset of the physical memory pages allocated to the first virtual machine, the backup manager is to restore the marked-up mappings of the first subset of the physical memory pages that have not been re-mapped to their pre-markup states, based at least in part on the saved mappings.

9. The apparatus of claim 1, wherein on start of backing up the first subset of the physical memory pages allocated to the first virtual machine, the backup manager is to further perform the journaling of data stored in re-mapped physical memory pages of modified ones of the first subset of the physical memory pages allocated to a first of the one or more virtual machines onto the backup device, that marks the re-mapped physical memory pages as read-only while the data stored in the re-mapped physical memory pages are being journaled onto the backup device.

10. The apparatus of claim 1, wherein the backup manager is to cause execution of the first virtual machine to be halted before saving the current mappings in the one or more page tables, since the start of the backing up of the first subset of the physical memory pages allocated to the first virtual machine, that map the virtual memory pages of the first virtual machine to the re-mapped physical memory pages, and to cause execution of the first virtual machine to be resumed after the current mappings in the one or more page tables, since the start of the backing up of the first subset of the physical memory pages allocated to the first virtual machine, which map the virtual memory pages of the first virtual machine to the re-mapped physical memory pages, have been marked up to denote the re-mapped physical memory pages as read-only.

11. The apparatus of claim 10, wherein on copying of the data stored in a re-mapped physical memory page, the backup manager is to restore the corresponding marked-up re-mappings to the pre-markup state, based at least in part on the corresponding saved re-mappings.

12. The apparatus of claim 10, wherein on completion of journaling the data stored in all re-mapped physical memory pages, the backup manager is to release the re-mapped physical memory pages for re-allocation.

13. The apparatus of claim 9, wherein after journaling data stored in re-mapped physical memory pages for a period of time, the backup manager is to further merge data stored in the re-mapped physical memory pages back into the first subset of the physical memory pages, that marks the re-mapped physical memory pages as read-only while the data stored in the re-mapped physical memory pages are being merged back into the first subset of the physical memory pages.

14. The apparatus of claim 13, wherein the backup manager is to mark up the current re-mappings in the one or more page tables to denote the re-mapped physical memory pages as read-only, before the start of merging the data stored in the re-mapped physical memory pages back into the first subset of the physical memory pages.

15. The apparatus of claim 14, wherein the backup manager is to cause execution of the first virtual machine to be halted before marking up the current re-mappings, and to cause execution of the first virtual machine to be resumed after the current re-mappings in the one or more page tables have been marked-up to denote the re-mapped physical memory pages as read-only.

16. The apparatus of claim 14, wherein on copying of the data stored in the re-mapped physical memory pages back into the first subset of the physical memory pages, the backup manager is to update the mappings of the one or more page tables to reflect the merge back into the first subset of the physical memory pages.

17. The apparatus of claim 1, further comprising a virtual machine manager to manage hosting of the virtual machines, wherein the virtual machine manager includes the one or more page tables and the memory manager.

18. A method for computing, comprising:
hosting, by one or more processors and persistent memory of a computing device, operation of one or more virtual machines;
storing a plurality of mappings in one or more page tables of the computing device to map a plurality of virtual memory pages of a virtualization of the persistent memory of the one or more virtual machines to a plurality of physical memory pages of the persistent memory allocated to the one or more virtual machines; and
backing up, by a backup manager of the computing device, data stored in a first subset of the physical memory pages allocated to a first of the one or more virtual machines onto a backup device, that marks the first subset of physical memory pages as read-only while the data stored in the first subset of the physical memory pages are being backed up from the first subset of physical memory pages to the backup device;
wherein backing up data comprises first saving current mappings of the one or more page tables, since a start of the backing up of the first subset of the physical memory pages allocated to the first virtual machine, that map the virtual memory pages of the first virtual machine to the re-mapped physical memory pages, and marking up the current re-mappings in the one or more page tables, since the start of the backing up of the first subset of the physical memory pages allocated to the first virtual machine, that map the virtual memory pages of the first virtual machine to the re-mapped physical memory pages, to denote the re-mapped physical memory pages as read-only, before journaling the data stored in the re-mapped physical memory pages onto the backup device.

19. The method of claim 18, further comprising:
managing accesses of the persistent memory, by a memory manager of the computing device, with a copy-on-write process to service write instructions that address the virtual memory pages mapped to the physical memory pages, which mappings in the one or more page tables are marked to denote the physical memory pages as read-only;
the memory manager receiving an address of a physical memory page allocated to a first of the one or more virtual machines that is marked as read-only and being addressed by a write instruction to a virtual memory page mapped to the physical memory page, from a page fault handler of the first virtual machine;
on receipt of the address of the physical memory page allocated to the first virtual machine that is marked as read-only and being addressed by a write instruction to a virtual memory page mapped to the physical memory page, allocating another physical memory page to the first virtual machine, and updating the one or more page tables to map the virtual memory page of the first virtual machine previously mapped to the physical memory page for which the address was received to the newly allocated physical memory page, with an access permission of an original mapping that maps the virtual memory page to the physical memory page for which the address was received; and
on re-mapping, emulating the write instruction to write data of the write instruction into newly allocated physical memory page, and thereafter, returning execution control to a next instruction of the first virtual machine, or returning execution control to the write instruction of the first virtual machine to write data of the write instruction into the newly allocated physical memory page.

20. One or more non-transitory computer-readable media comprising instructions that cause a computing device having a persistent memory, in response to execution of the instructions by a processor of the computing device, to
store a plurality of mappings in one or more page tables of the computing device to map a plurality of virtual memory pages of a virtualization of the persistent memory of one or more virtual machines hosted by the processor and the persistent memory to a plurality of physical memory pages of the persistent memory allocated to the one or more virtual machines; and
back up data stored in a first subset of the physical memory pages allocated to a first of the one or more virtual machines onto a backup device, that marks the first subset of physical memory pages as read-only while the data stored in the first subset of the physical memory pages are being backed up from the first subset of physical memory pages to the backup device;
wherein to back up data comprises first save current mappings of the one or more page tables, since a start of the backing up of the first subset of the physical memory pages allocated to the first virtual machine, which map the virtual memory pages of the first virtual machine to the re-mapped physical memory pages, and mark up the current re-mappings in the one or more page tables, since the start of the backing up of the first subset of the physical memory pages allocated to the first virtual machine, which map the virtual memory pages of the first virtual machine to the re-mapped physical memory pages, to denote the re-mapped physical memory pages as read-only, before journaling the data stored in the re-mapped physical memory pages onto the backup device.

21. The non-transitory computer-readable media of claim 20, wherein
on start of backing up the first subset of the physical memory pages allocated to the first virtual machine, journal data stored in re-mapped physical memory pages of modified ones of the first subset of the physical memory pages allocated to a first of the one or more virtual machines onto the backup device, which marks the re-mapped physical memory pages as read-only while the data stored in the re-mapped physical memory pages are being journaled onto the backup device; and
after journaling data stored in re-mapped physical memory pages for a period of time, merge data stored in the re-mapped physical memory pages back into the first subset of the physical memory pages, which marks the re-mapped physical memory pages as read-only while the data stored in the re-mapped physical memory pages are being merged back into the first subset of the physical memory pages.

22. The apparatus of claim 1, further comprising a virtual machine manager to manage hosting of the virtual machines, wherein the virtual machine manager includes the backup manager.

23. The apparatus of claim 22, wherein the virtual machine manager further includes the one or more page tables.

* * * * *